United States Patent [19]

Carll

[11] 4,241,398
[45] Dec. 23, 1980

[54] COMPUTER NETWORK, LINE PROTOCOL SYSTEM

[75] Inventor: Richard T. Carll, Granby, Conn.

[73] Assignee: United Technologies Corporation, Hartford, Conn.

[21] Appl. No.: 947,298

[22] Filed: Sep. 29, 1978

[51] Int. Cl.³ .............................................. H04L 7/02
[52] U.S. Cl. .................................. 364/200; 375/55; 375/87; 360/44
[58] Field of Search ... 364/200 MS File, 900 MS File; 178/67, 53.1 R; 340/170; 360/44; 375/55, 87

[56] References Cited

U.S. PATENT DOCUMENTS

| | | | |
|---|---|---|---|
| 3,092,833 | 6/1963 | Phillips | 178/53.1 R |
| 3,281,806 | 10/1966 | Lawrance et al. | 360/44 |
| 3,470,478 | 9/1969 | Crafts | 178/67 |
| 3,611,143 | 10/1971 | Gervan | 178/67 |
| 3,794,978 | 2/1974 | Staron | 340/170 |
| 3,863,025 | 1/1975 | Gonsewski et al. | 178/68 |
| 3,962,647 | 6/1976 | Richman | 178/67 |
| 4,049,909 | 9/1977 | Peck | 178/67 |
| 4,142,065 | 2/1979 | Tannhauser | 178/69.1 |

*Primary Examiner*—Gareth D. Shaw
*Assistant Examiner*—C. T. Bartz
*Attorney, Agent, or Firm*—Dominic J. Chiantera

[57] ABSTRACT

A line protocol format with a low bit overhead provides for the high accuracy, asynchronous exchange of digital signal information between processing units in a supervisory control system having a central processing unit (CPU) and at least one remote processing unit (RPU).

3 Claims, 8 Drawing Figures

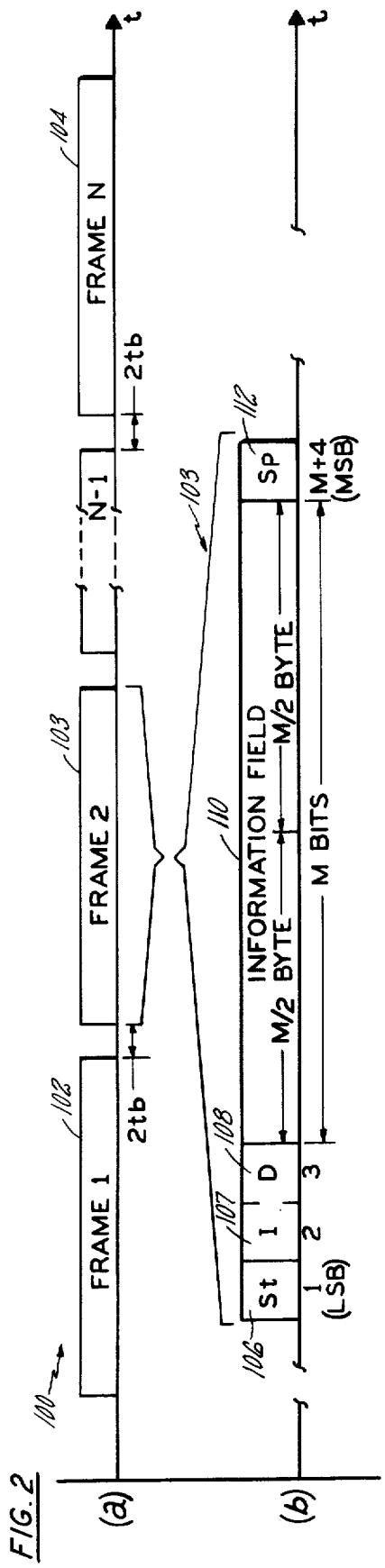
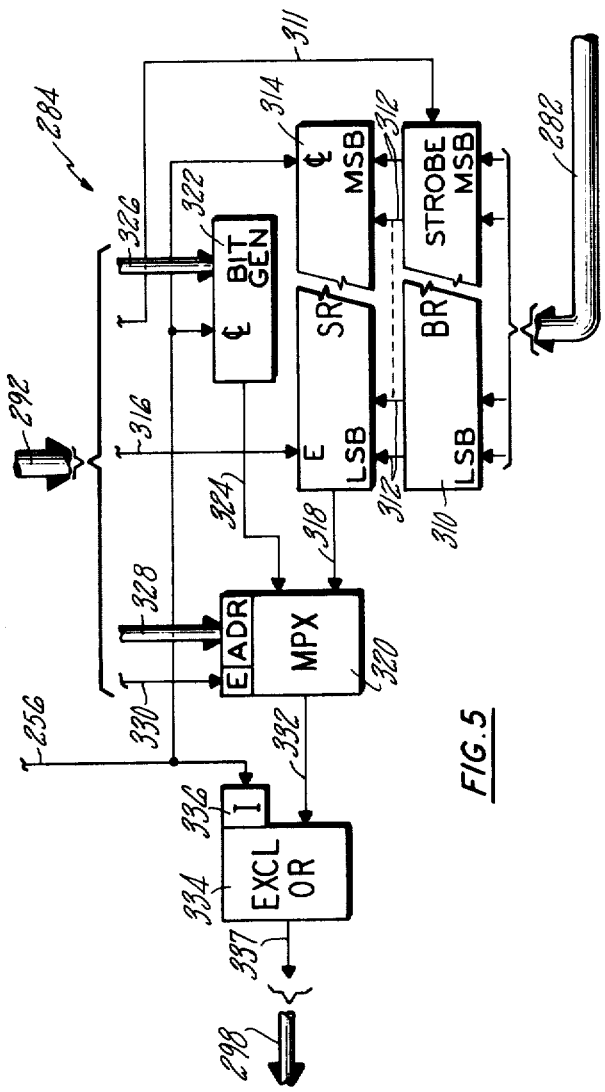
FIG. 2
FIG. 5

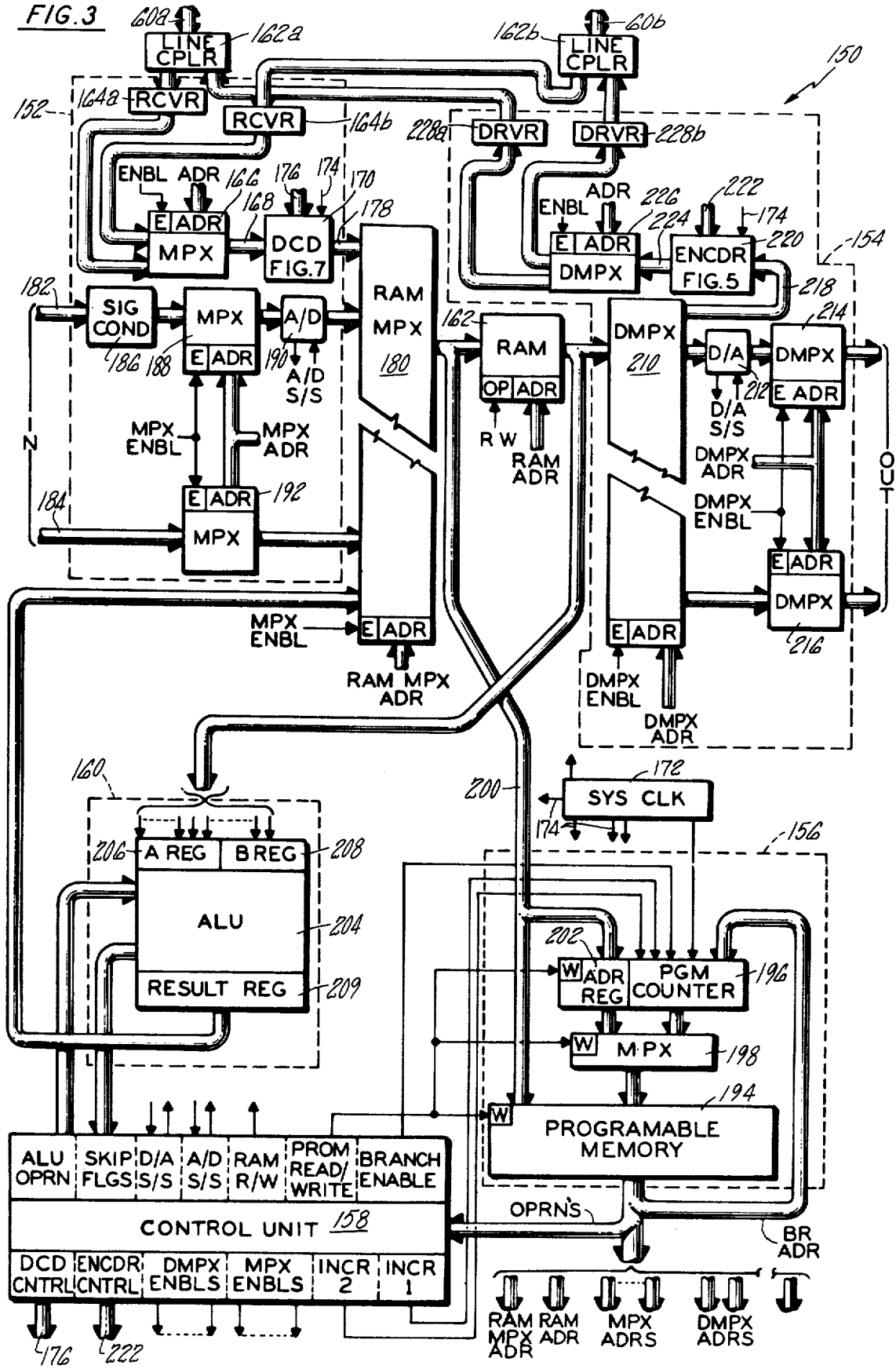

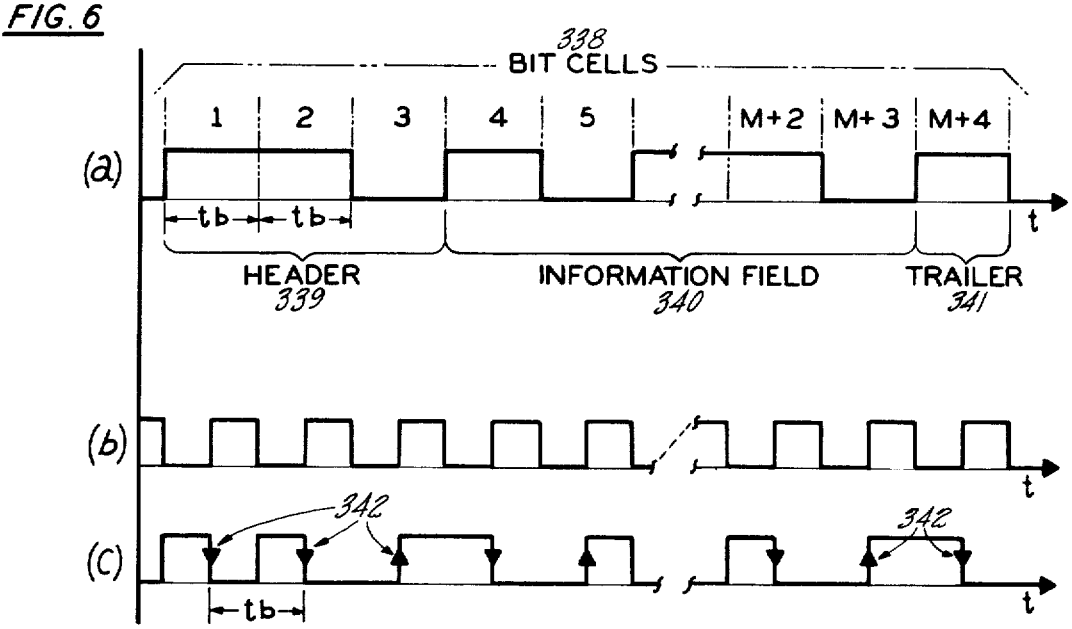

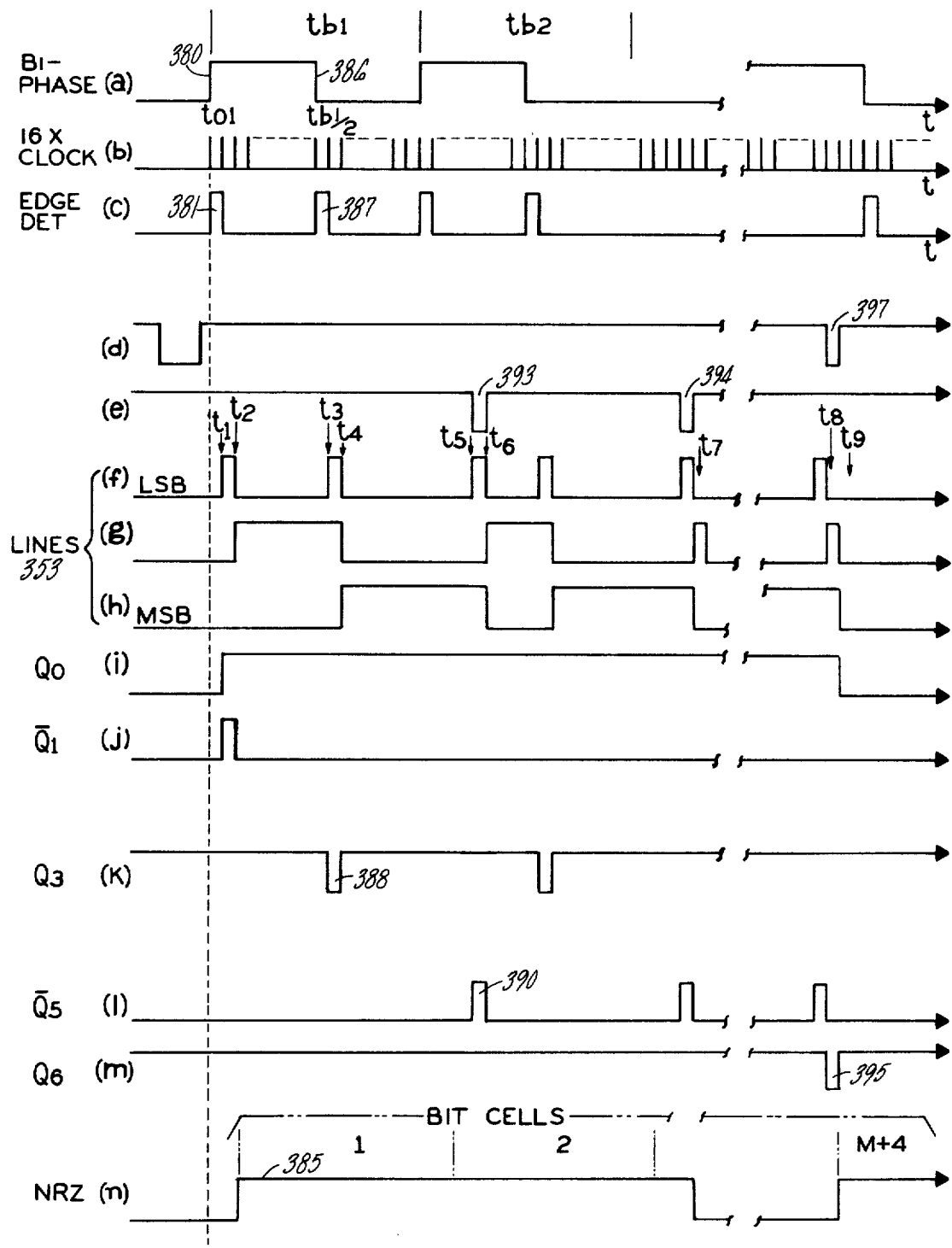

COMPUTER NETWORK, LINE PROTOCOL SYSTEM

BACKGROUND OF THE INVENTION

1. Field of Invention

This invention relates to a computer network line protocol, and more particularly to a line protocol for providing the asynchronous exchange of digital signal information between electronic processing units of a supervisory control system.

2. Description of the Prior Art

Line protocols for controlling intracomputer communications are well known in the art and are required to organize the transmission of data from one computer to another in a manner which assures correct sequencing and data integrity. The line protocols presently available each have particular characteristics and advantages related to the type of interface over which data is transferred, i.e. full or half-duplex, synchronous or asynchronous, serial or parallel, etc. An excellent primer on the subject may be found in a book by E. B. Stelmach, entitled "Introduction to Mini-Computer Networks", Copyright 1974 by Digital Equipment Corporation, Chapter 5.

All of the known line protocols have a common characteristic, each requires a significant number of dedicated, overhead signal bits within the transferred data message format, i.e., signal bits that are required for use other than for the transfer of the data information. These bits are required to ensure the accuracy of the data transmitted in the information field of the message block. Where a large number of data bits are transmitted in each message block, such as in batch transfers using a synchronous data link control (SDLC) protocol, the header field positions (start flag, address field and control field) and trailer field (frame checking and stop flag) may each comprise twenty-four bits for a total of forty-eight bits in each frame. These dedicated signal bits are an overhead cost in the transmission of data under the particular line protocol format since they require some portion of the line utilization time period which may otherwise be used for the transfer of data. This results in some degree of loss in throughput efficiency of the line. In volume data transfers, i.e. "batch transfers" in which the typical information field is on the order of two thousand bits, the overhead bits required by the protocol represent a small percentage of the total bits in each message. In contrast, intercommunication protocol between computers in a supervisory type control system, such as that disclosed in the hereinbefore referenced copending applications in which a central processing unit (CPU) controls and supervises the operation of some number of remote processing units (RPUs), the CPU is constantly corresponding with all RPUs at comparatively high band rates, with the communication to each individual RPU comprising relatively short message lengths interspersed with comparatively long pause intervals. There is no intercommunication between RPUs, but only between each RPU and the CPU, such that the required protocol format is essentially a link control format.

Due to the short messsage lengths involved in the information transfer, on the order of one hundred bits per message unit, the line protocol must have a low bit overhead to permit a reasonable throughput efficiency while still allowing for the highest accuracy possible, i.e. intercommunication integrity, since in such a control system erratic or faulty transmissions could result in catastrophic failure of the control item at the remote sites. Similarly, such a control system does not permit for synchronous data transmission since the nature of the installation is that of a network of hard wired remote units where the cost for installation and maintenance of separate clock lines over the long distances between units is impractical. Therefore, the protocol must ensure low overhead to allow for the highest throughput rates, error control to ensure the highest accuracy to avoid any catastrophic failures, and provide for asynchronous exchange of signal information between processing units.

SUMMARY OF THE INVENTION

An object of the present invention is to provide a low overhead line protocol for controlling the asynchronous exchange of digital signal information between a central processing unit (CPU) and one or more remote processing units (RPUs) of a supervisory control system.

According to the present invention, digital signal information in the form of parallel digital words to be exchanged between the CPU and RPUs, each alternating as sending and receiving units, is converted into serial bits and organized into bit cells in the information field of one or more serial data frames of a message unit, each frame also including a header field and a trailer field, the header field having a single bit start flag as the least significant bit (LSB) of the frame and having a two bit identification (ID) flag, the trailer field having a single bit stop flag as the most significant bit (MSB) of the frame, each message unit including a cyclic redundancy checking (CRC) frame following the last data frame of the unit, each frame of the message unit being encoded serially into a bi-phase signal format which provides at least one signal level transition in each bit cell at a period equal to the bit cell time established by the sending unit and in a direction dependent on the logic level of the digital signal bit in the cell, to provide a signal manifestation of the sending unit digital signal information and time base, the bi-phase encoded frames of the message unit being presented asynchronously, as a serial data stream, through a transformer coupled half-duplex transmission line to the receiving unit which decodes each frame to restore the digital signal information and time base presented by the sending unit. In further accord with the present invention, the information field of the first frame of each message unit transmitted from or received by the CPU includes a first byte address identifying the particular RPU acting as the sending unit or receiving unit of the message, the first frame of each message unit transmitted by the CPU having a first frame CPU ID flag bit pattern different from the ID flag pattern of each successive frame in the message unit and different from the ID flag of each frame, including the first frame, of message units transmitted from each RPU, each RPU interrupting operation only in response to a message unit received with a first frame CPU ID flag pattern and first byte address identifying the RPU. In still further accord with the present invention, each message unit is checked by the receiving unit with a sixteen bit polynomial included in the information field of the CRC frame, each message unit received accurately by an RPU is acknowledged with a bi-phase encoded ACK signal presented to the CPU within a set time interval monitored by a watchdog timer at the CPU, which in the absence of the ACK signal in the time interval retransmits the original message unit, messages received inaccurately by the CPU are retransmitted by the RPU on CPU request.

In still further accord with the present invention, message units are limited to a maximum number of frames determined to be that which provides the lowest practical probability of CRC error, related signal information presented by a sending unit for transfer to a receiving unit being transferred in one or more message units as may be necessary.

These and other objects, features and advantages of the present invention will become more apparent in the light of the following detailed description of the preferred embodiment thereof, as illustrated in the accompanying drawing.

BRIEF DESCRIPTION OF THE DRAWING

FIG. 2 is a simplified illustration of a message unit format according to the present invention;

FIG. 3 is a simplified, block diagram of a remote processor unit which may be used in the control system of FIG. 1;

FIG. 5 is a schematic diagram illustration of a bi-phase signal encoder used with the present invention;

FIG. 6 is an illustration of the operating waveforms of the encoder of FIG. 5;

FIG. 8 is an illustration of the operating waveforms of the signal decoder of FIG. 7.

DETAILED DESCRIPTION

Figure 1:
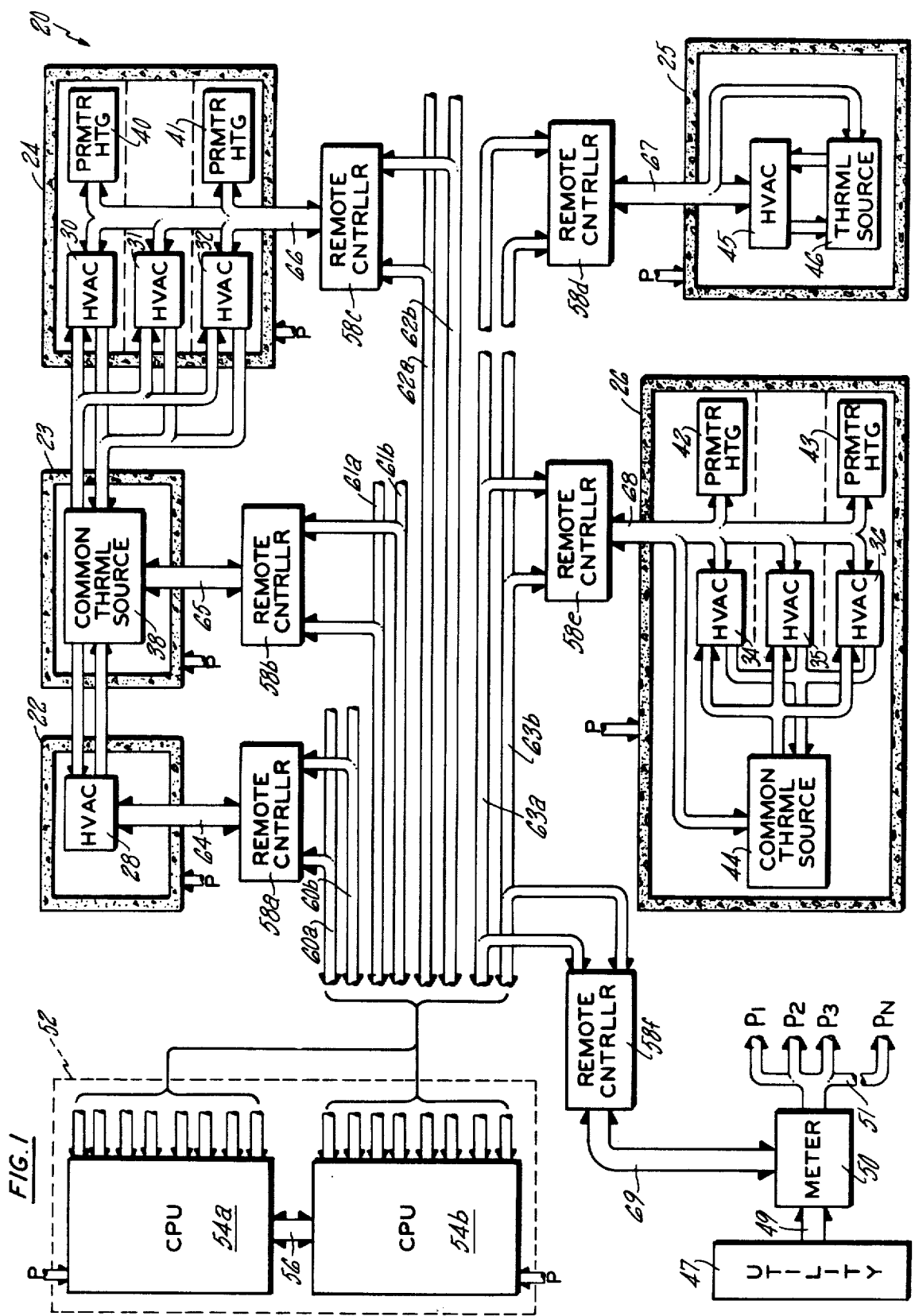
FIG. 1 is a system block diagram of a central supervisory control system in which the present invention may be used.

The line protocol of the present invention may be used in the supervisory control system disclosed in the hereinbefore cross referenced, copending application, which is illustrated in FIG. 1 with original reference numerals. As illustrated, the facility 20 includes remote locations, i.e. buildings or enclosures in which the heating and ventilation is to be controlled (22-26). A central controller 52 includes a pair of central processing units (CPUs) 54$_a$, 54$_b$ connected to remote controllers 58$_a$—58$_f$ through multi-drop trunklines 60—63 each including a pair (a, b) of dual triaxial cables having a center conductor and center shield for signal interconnection between the CPU and remotes, and having a grounded outer shield. The triax cables (a, b) provide half-duplex interconnection between the CPU and each remote controller, requiring reverse direction programming on the line.

In the protocol format of the present invention, digital data is transmitted as an asynchronous, serial data stream of message units, at a rate of fifty thousand band. The digital data transmitted is first encoded, bit by bit, into an asynchronous bi-phase encoded signal format, such as the Manchester bi-phase code, which allows for transformer coupling of the encoded data through the half-duplex lines between each remote controller and CPU. Each message unit comprises at least two fixed length frames, and each message transmitted from the CPU to the remote controller must be acknowledged (ACK) in a set time period in response to error-free reception. The no-acknowledge (NAK) signal for messages received in error is not used, rather the non-presence of an ACK signal from the remote in a set period results in retransmittal of the entire message unit by the CPU. Message units transmitted from the remotes to the CPU are not acknowledged, however, if received in error the CPU requests retransmittal of the message. At least two bit cell times separate successive frames within a message unit block to allow sufficient time for STOP FLAG bit recognition.

Referring to FIG. 2 illustration (a), a message unit 100 includes N number of frames 102-104 spaced at a minimum two bit cell time interval (2t$_b$). The format of each frame is identical and, as illustrated by the frame 103 in illustration (b), includes in succession from the least significant bit (LSB) to the most significant bit (MSB): a first, single bit 106 START FLAG, a two bit (107, 108) FRAME IDENTIFICATION (ID) flag, an M bit information field 110, and a single bit 112 STOP FLAG as MSB. Each frame has a total of M+4 bit cells, with a total overhead of four bits in each frame.

The information field 110 is divided into two bytes, each having M/2 bits. The time base, i.e. bit cell time information, is transmitted through the bi-phase encoding, as described hereinafter. Since transmission is asynchronous, synchronization between central and remote controllers is dependent on the START and STOP FLAG bits and ID bits in each frame, such that the maximum number of bits in the information field is limited by the permissible time interval between these synchronization bits. In an exemplary embodiment, the bit length of the information field is sixteen bits (M=16), two eight bit bytes, which together with the four bit overhead results in a total of twenty bits per frame.

In each message unit (100, FIG. 2) the first frame provides in the first byte of the information field the address of the particular one of the remote controllers on the multi-drop trunkline involved in the instant communication, and in the second byte the control information. The control information identifies the particular action requested of the remote by the CPU, or a coded remote controller response, i.e. ACK, status indication, etc. The address byte always identifies the remote controller, whether it is receiving or transmitting, since the CPU is the only recipient for remote controller transmissions (no intra-remote controller communication). The information field of the last frame of the message unit provides a two byte CRC check frame for checking the integrity of the transmitted message. The CRC is generated using the known sixteen bit polynomial $X^{16}+X^{15}+X^2+1$.

Each remote controller (58$_a$—58$_f$, FIG. 1) includes a remote processing unit (RPU) having the architecture of a typical digital microprocessor system, as illustrated in FIG. 3 by the RPU 150 which is a combination of basic microprocessor elements including: input, output sections 152, 154 for receiving and transmitting information to the CPU and to the device controlled by the particular remote controller, i.e. environmental conditioning systems (ECS), a main memory section 156 for providing programmed instructions (reprogrammable by the CPU) for the RPU through operand address programming, a control unit 158 for providing program control of RPU operation sequencing, an arithmetic unit 160 for providing the operational add, subtract, multiply and divide functions, and a random access memory (RAM) 162 for providing memory storage of interim and final result outputs from the arithmetic unit 160 and for storage of signal information received from the input section 152.

The input section 152 receives signal information from the CPU on each of the triaxial lines, such as lines $60_a$, $60_b$ of the trunkline 60, alternately, as established by the line protocol. The information from the lines $60_a$, $60_b$ is presented through associated line coupling networks $162_a$, $162_b$, each identical and employing standard current loop coupling techniques known in the art. The line coupling networks are bidirectional, coupling transmitted and received bi-phase signal data between the RPU and the triaxial lines. The output of the couplers $162_a$, $162_b$ is presented through associated line receivers $164_a$, $164_b$ to a multiplexer (MPX) 166 which scans each receiver output in dependence on an enable signal and MPX program address from the memory 156, in response to the command of MPX strobes generated by the control unit 158. The MPX presents the selected receiver bi-phase signal information through lines 168 to a signal decoder circuit 170 which converts the bi-phase signal to the standard non-return to zero (NRZ) digital signal format, as described in detail hereinafter with respect to FIG. 5. The decoder receives timing and control signal inputs: from a system clock 172 on the line 174, and from the control unit 158 on the lines 176. The NRZ signal from the decoder is presented through lines 178 to one input of a RAM MPX 180 which also receives analog and discrete signals from the ECS on lines 182, 184 respectively. The analog signals are presented through signal conditioners 186, MPX 188, and analog-to-digital (A/D) converter 190, and the discretes through an MPX 192. The MPXs 188, 192 are enabled and operate under program control from the programmable memory 203, and the A/D converter exchanges START/STOP commands with the control unit 204. In addition, the RAM MPX 180 also receives the output from the arithmetic unit 160.

The main memory 156 includes a programmable, read/write memory 194 responsive, alternately, to: (1) a program counter 196 output presented through an MPX 198, or (2) to CPU interrupt/reprogramming instructions presented from the RAM MPX 180 on the lines 200 directly to one input and also through register 202 and MPX 198 to a second input of the memory. The programmable memory provides: operand address programming for the RAM MPX 180 and RAM 162 address, the program address for the MPX, DMPX of input, output sections 152, 154, and operand and branch addressing to the control unit 158 and program counter 196, respectively.

The arithmetic unit 160 includes an ALU 204 which provides the selected mathematical operation (add, subtract, multiply and divide) to data presented from the RAM 162 through operating A and B registers 206, 208 in response to command signals from the control unit 158. The memory 194 provides the RAM operand address to control the data presented to the ALU. As required, the ALU generates SKIP FLAGS to the control unit to provide skip instructions for the programmable memory, as may be necessary during a particular mathematical operation. The ALU resultant data is presented through a result register 209 and RAM MPX 180 to the RAM 162, and stored until called for.

The data stored in RAM is presented either to the CPU or to the associated ECS (on CPU request, or programmable memory program command) through a DMPX 210 under program control from the memory 194. The DMPX 210 presents: ECS analog signals through a digital-to-analog (D/A) converter 212 and DMPX 214 to an associated one of the interconnecting lines (64-69, FIG. 1), the ECS discrete signals through a DMPX 216 to the associated line, and signal information to the CPU through lines 218 to a signal encoder circuit 220 which converts the NRZ signal into the bi-phase format, as described hereinafter with respect to FIG. 7. The encoder 220 receives the system clock signal on the line 174 and the control unit signals on the lines 222, and provides the encoded serial bi-phase data stream through lines 224 to a DMPX 226, which presents the signal to one of the line drivers $228_a$, $228_b$, alternately, each associated with one of the line couplers $162_a$, $162_b$. All DMPXs (214, 216 and 226) are under program control from the programmable memory 194, and the D/A 212 exchanges start/stop strobes with the control unit 158.

In the operation of the RMP, as known to those skilled in the art, the RAM MPX 180 reads data from the input section 152 into the RAM 162, where it is stored at address locations determined by a RAM address program from the memory 194. The programmable memory scans and identifies all data entries into RAM from the line 200 by ordering both stored data and stored control character code information from the RAM 162 into the A and B registers 206, 208 of the arithmetic unit 160. A memory subroutine sequentially compares identifying bit characters contained within selected bit cells of the information field in each frame of a message unit with each of a plurality of identifying characters contained within a character code stored in RAM, until the information is identified. Depending upon identification, the program may branch to various addresses as determined by the memory (either the address identified in the message unit or an address necessary to respond to the CPU request) and the word may be returned to the same loction in RAM or changed to a different address location. This may be accomplished through SKIP FLAGS presented to the control unit 158 from the ALU 204. A SKIP FLAG causes the program counter to increment two steps, such as to bypass a branch instruction; no SKIP FLAG causes an increment of one allowing execution of the next sequential instruction (operational or branch). Use of various branch instructions enables the program to unconditionally branch to an address stored in the programmable memory 194 to call up various subroutines as required for program operation during normal running of the RMP.

The programmable memory 194 provides a subroutine for identifying CPU program change instructions, wherein the first frame of the message unit from the CPU is presented through the MPX 180 into a RAM memory location determined by the address program. The address and control field words are identified by normal memory scanning of the stored RAM data through the subroutine described hereinbefore. When the first frame is identified as a CPU instruction for the particular RPU (the first byte address in the information field of the first frame), a memory write strobe from the control unit 158 is presented to the address register 202 allowing entry into the register of the second byte appearing on the line 200, and containing the control field instruction. The second frame from the CPU, containing additional information such as the address location in memory for the new instruction, RMP status, etc., is presented from the lines 200 to the input of the memory 194 simultaneously with the presentation of a second write strobe from the control unit 158 to the MPX 198, which allows the memory to read the instructions stored in the register 202 together with the additional instruction information appearing at the input on the line 200. In this manner the operating program instructions stored in the memory are altered by CPU command. Similarly, the values of operating constants for the ECS stored in the RAM 162 may be changed on CPU instruction which orders the memory 194 to pull out the appropriate constant stored in a particular address in the RAM and read in the new constant value.

The RPU 150 is asynchronous with the CPU, requiring asynchronous transmission between each. Typically, the CPU receives data from the RPU every ten seconds and the RPU scans all of the data input lines every second. This normal free-running scan of the sensed data is interrupted for communication with the CPU, for both program change commands and commands for data readout. The RPU interrupt time required in responding to the CPU is approximately 5% of the total RPU running time, indicating the intermittent nature and long pause intervals in communications between each.

The RPU of FIG. 3 is illustrative of only one configuration of a microprocessor system suitable for use in the FIG. 1 supervisory control function, and with which the line protocol of the present invention may be used. The specific architecture of the microprocessor is dependent on the particular control use and implementation and the architecture itself forms no part of this invention. Any suitable general purpose microprocessor known in the art, such as the industry standard model 8080A, may be used with standard programming techniques.

Figure 4:
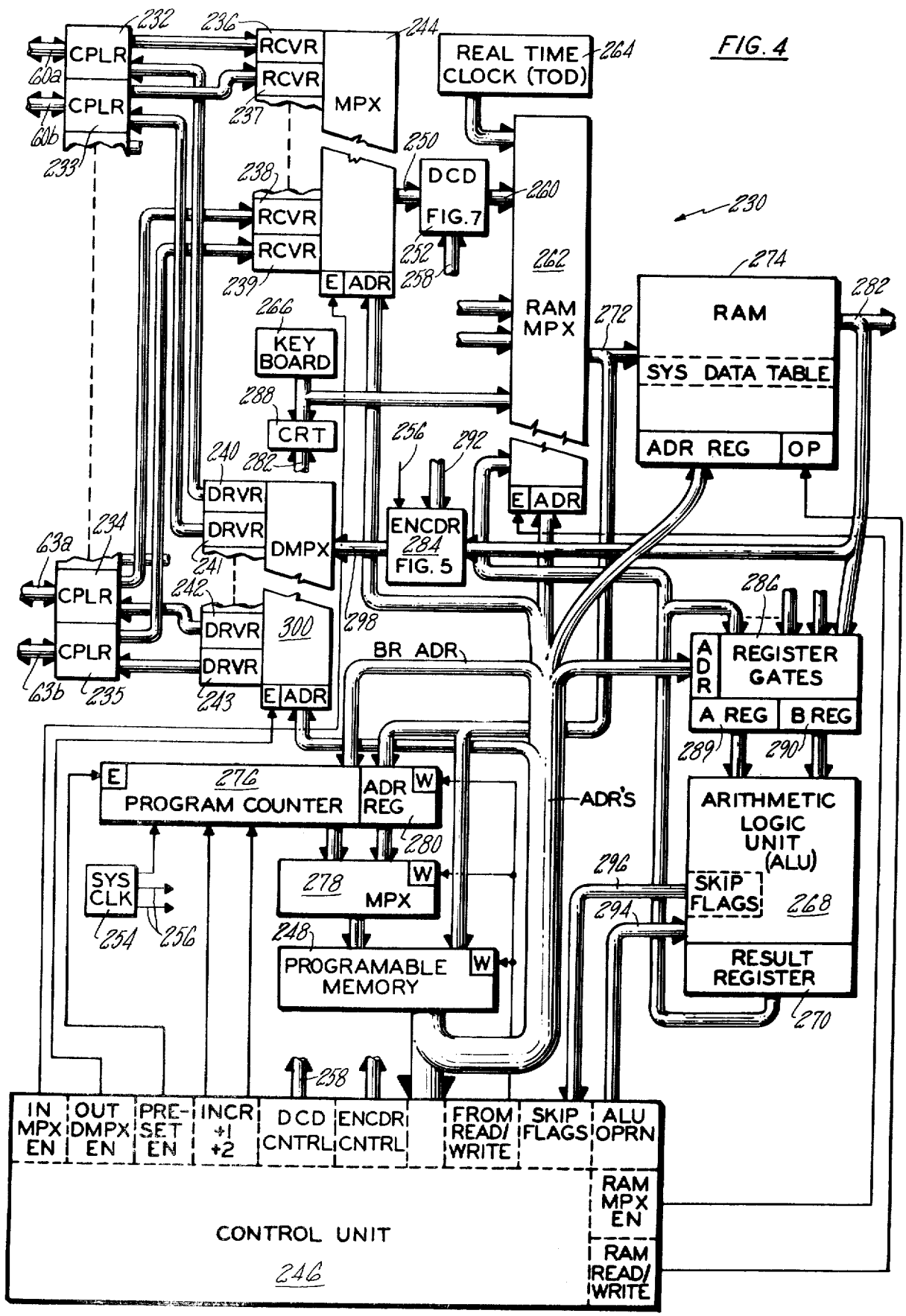
FIG. 4 is a simplified, block diagram of a central processing unit which may be used in the control system of FIG. 1.

Referring to FIG. 4, a CPU which may incorporate the central control function is illustrated as representing the architecture of a typical, real time data processing system 230. Each triaxial line (a, b) of each trunkline (60–63, FIG. 1) is presented through line coupling networks 232–235, identical to the couplers 162$_a$, 162$_b$ (FIG. 3), to associated line receivers 236–249. Each coupler also receives the output from an associated line driver 240–243. The receiver outputs are presented to an MPX 244 which, when enabled by a strobe from a control unit 246, scans each output under an address program control from a programmable memory 248 presenting each receiver output, in turn, through lines 250 to an input of a decoder circuit 252, identical to the decoder 170 of FIG. 3. The decoder receives the system clock signal from the clock 254 on lines 256 and control signal information from the control unit 246 on lines 258, and decodes the serial bi-phase signal into the NRZ format which is presented as a parallel word through lines 260 to an input of a RAM MPX 262. The RAM MPX also receives: the output from a real time clock 264 (which provides the time of day required for the supervisory control functions disclosed in the referenced copending application), the output of a keyboard 266, and the output of an ALU 268 presented through a result register 270. The RAM MPX, when enabled by a strobe from the control unit 246, scans each of the input lines under address control from the programmable memory 248, and presents the data through lines 272 to the input of a RAM 274 and to a write input of the memory 248. The RAM 274 is under an address program control from the memory 248 and receives operational code strobes (RAM READ/WRITE) from the control unit 246.

The control unit 246 responds to command inputs from the programmable memory 248 which is controlled by the output of a programmed counter 276 presented through an MPX 278. The program counter receives the line 256 clock signal and is responsive to preset enable, increment one, and increment two strobes from the control unit 246. The MPX 278 is responsive to READ/WRITE control signals from the control unit 246 to present either the output of the program counter 276, or alternatively the output of a register 280 to the input of the memory 248. The register 280 receives the output from the RAM MPX 262 and is used in conjunction with a subroutine similar to that described hereinbefore with respect to the RPU 150 of FIG. 3 to provide operator reprogramming of the memory through keyboard 266.

The RAM 274 output is provided through lines 282 to an encoder 284 identical to encoder 220 of FIG. 3, to one input of a plurality of register gates 286, and to an input of a video display (CRT) 288. The CRT provides visual display of input/output information presented through the keyboard and from RAM. The gates 286 control the data flow into the A and B registers 289, 290, under an address program provided from the memory 248.

The encoder 284 receives the line 256 system clock signal and control signal information on lines 292 from the control unit 246. The serial bi-phase signal from the encoder is presented through lines 298 to a DMPX 300 which sequentially, under an enabled strobe from the control unit 246 and in response to the address programming from the memory 248, presents the encoded signal to the selected one of the line drivers 240–243 in dependence on the address program.

The stored program in memory 248 is implemented through control unit 246 which provides enabling strobes for the CPU MPXs, DMPXs in addition to providing operative read/write instructions to the RAM 274 and the operation instructions, i.e. selected arithmetic operations (add, subtract, multiply and divide) or logic and compare functions, to the ALU 268 on lines 294. The control unit receives instruction inputs to alter the sequence of the memory 248 in response to SKIP FLAGS generated in the ALU 268 and presented to the control unit on the lines 296.

The data processing system of FIG. 4 represents one configuration of dedicated hardware, data processing apparatus which may be used in the supervisory control system of FIG. 1, and in which the line protocol of the present invention may be used. However, the specific architecture is dependent on the particular implementation of the supervisory control system and as such the architecture forms no part of the present invention. Any one of a number of well known processing systems may be used as may be obvious to those skilled in the art, such as the Digital Equipment Corporation Model PDP1135 or PDP1140 general purpose computers used in combination with real time operating software such as the Digital Equipment Corporation RSX11M real time software system.

Referring now to FIG. 5, an encoder, such as the encoder 284 of FIG. 4, receives the NRZ digital signal information on lines 282 from the RAM (274, FIG. 4). The digital data is presented as parallel digital words to the inputs of a parallel in/parallel out register 310 which receives a strobe on a line 311, included in lines 292 from the control unit 246 (FIG. 4). The digital word has M bits equal to the bit length of the information field of the data frame (103, FIG. 2), which in the present embodiment is sixteen bits formatted in two eight bit bytes. The register 310, when strobed, presents the digital word through lines 312 to the input of a parallel in/serial out shift register 314 which, when presented with a discrete enable (E) from the control unit on the line 316 (similarly included in lines 292), shifts the digital word out onto a line 318 to the input of an MPX 320. The shift occurs one bit at a time, each bit shifts in response to a successive clock pulse presented on the line 256. The MPX 320 also receives the output from a signal bit generator 322 on a line 324. The generator may be a small read only memory (ROM) which functions as a look-up table providing the START/STOP bits and ID bits for each frame in response to look-up address presented through the lines 326, included in the lines 292 from the control unit 246 (FIG. 4). The bit generator is clocked simultaneously with the shift register 314. The shift register is selectively enabled through the line 316 to provide on the line 318, serially, the signal bits of the NRZ digital word, and when disabled allows the generator 322 to insert the selected header and trailer signal bit information for each frame, such that the two operate in conjunction to provide the signal bits for each frame.

The MPX 320 is under program address control from the control unit 246 and is provided with address and enabling inputs on the lines 328, 330. The address input to the MPX on lines 328 selects, alternately, the bit information appearing on the lines 318 or 324 to provide the frame format, which is presented one bit at a time through a line 332 to an exclusive OR (EOR) 334. The EOR also receives an inverted system clock signal presented through an invert gate 336 from the line 256. The operation of the EOR is well known, and the presence of the signal bits on the line 332 and inverted clock signal provides the phase encoded signal in a manner illustrated in FIG. 6, illustrations (a) through (c). Illustration (a) shows a portion of a sample frame having M+4 bit cells 338, with equal bit cell time ($t_b$). The header portion 339 is shown with the LSB START FLAG=1 (bit cell 1), and the two bit ID FLAG=1,0 (bit cells 2, 3) The information field 340 first two bits=1,0 and the last two (M+2, M+3)=1,0. Finally, the single (M+4) bit trailer field 341 is (MSB of the frame)=1. Therefore, illustration (a) depicts a binary 11010 . . . 101 digital signal. Illustration (b) shows the inverted clock signal. Illustration (c) shows the output phase encoded, serial data stream from the EOR 334 on the line 337, which is presented through lines 298 to the DMPX 300 (FIG. 4). As shown in illustration (c) the phase encoded signal provides a midbit level transition 342 in each bit cell, at a period equal to the bit cell time ($t_b$) as is typical of bi-phase encoded signal formats, such as the Manchester phase encoded format. This allows transformer coupling of the phase encoded data through the line couplers 232-235 (FIG. 4) and $162_a$, $162_b$ (FIG. 3).

Figure 7:
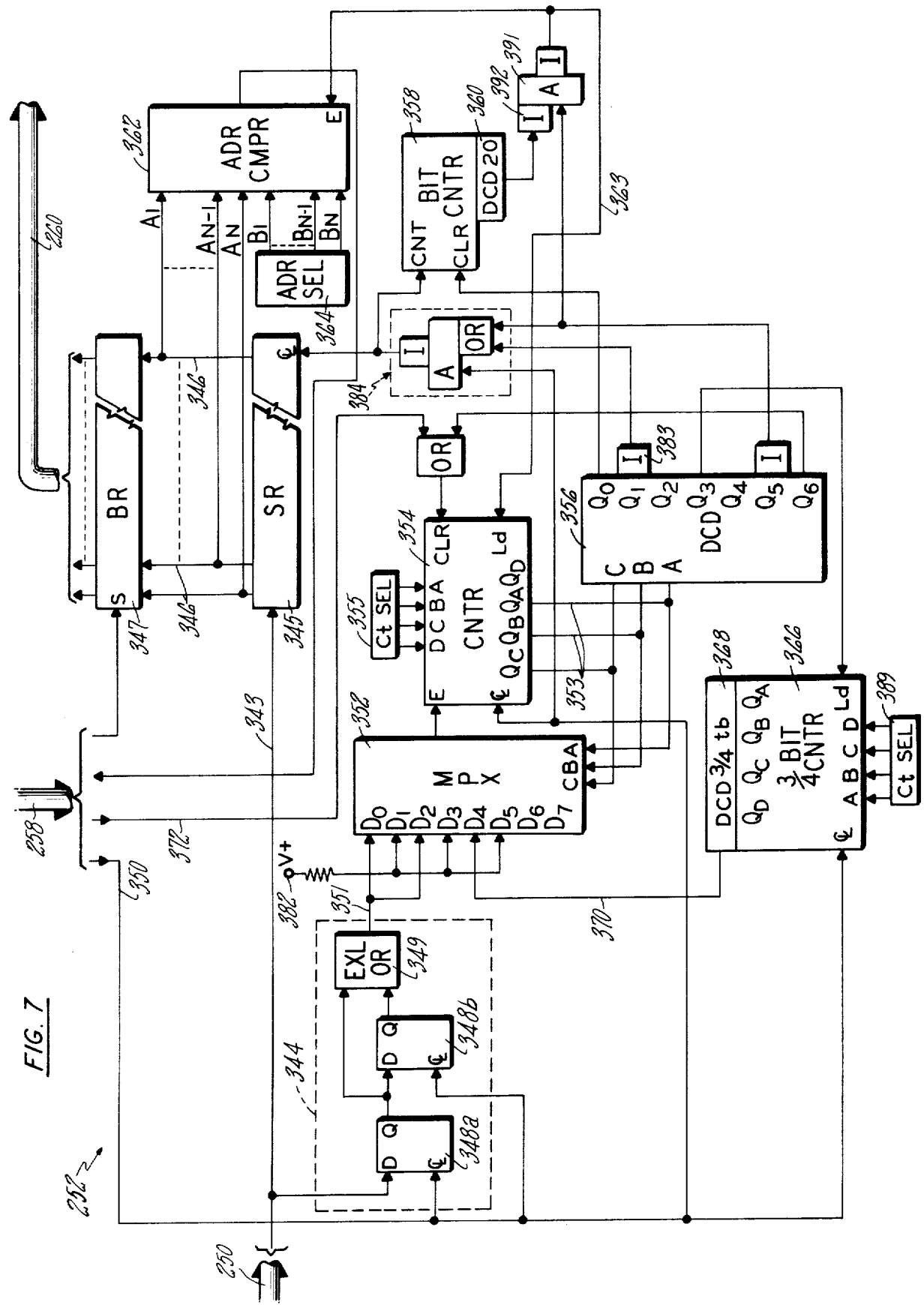
FIG. 7 is a schematic diagram illustrating of a bi-phase signal decoder used with the present invention.

The phase encoded signals transmitted from the CPU and each RPU are decoded within the receiving processor unit (CPU, RPU) through decoder circuits 178, 252 of FIGS. 3, 4, each of which is functionally identical. Referring now to FIG. 7, in a decoder 252 the serial bi-phase signals on the lines 250 from the MPX 244 (FIG. 4) is presented through a line 343 to an edge detector 344 and to a serial to parallel shift register 345, which may comprise a plurality of shift registers, such as the National Semiconductor 74164J, connected in series to provide the required bit cell capacity for the data frame. The shift register 345 output is a parallel digital word presented through lines 346 to a buffer register 347, the output of which is presented through lines 260 to the RAM MPX 262 (FIG. 4). The edge detector 344 includes flip-flops $348_a$, $348_b$ connected in series with the Q output of each presented to the inputs of an EOR 349. Each flip-flop receives a clock signal on a line 350, typically at a frequency sixteen times greater (16×clock) than the clock signal frequency used in the encoder circuit 284 (FIG. 5) to allow detection of the START FLAG bit to within one-sixteenth of a bit cell time ($t_b$). The edge detector output is connected through a line 351 to an MPX 352, such as the National Model 74161J, which receives address signals on lines 353 from a synchronous counter 354, such as the National Model 74161J. The counter 354, when enabled by an enable signal (E) from the MPX 352 is incremented on each clock pulse on the line 350, and provides: a first address with a 000 count for the first bit (START FLAG bit) of each frame of a message unit, and a preset count established by a count select circuit 355, as the first address for each of the remaining bits of each frame, as described hereinafter.

The address lines 353 are also presented to a decimal decoder 356, such as the National Model 7442, which provides a particular logic discrete signal on the output ($Q_0$-$Q_6$) selected by the address, the discretes being used to sequence the circuitry of the decoder. A bit counter 358 identical to the counter 354 provides an update count of the number of bits shifted into the register 345, and when M+4 bits have been entered (twenty bits in the present embodiment), it provides a discrete end of frame (EOF) signal through a state count decoder 360. Each EOF discrete is presented through a line 363 to the LOAD (Ld) input of counter 354 and clears the counter to the 000 address count following each complete frame. The EOF for the first frame of a message unit, identified by a distinct 10 ID bit pattern, also enables an address comparator 362 having $A_1$-$A_N$ inputs connected to the lines 346, and $B_1$-$B_N$ inputs connected to an address select circuit 364. The address comparator 362 compares the address information contained in the first byte of the information field to: (1) for an RPU decoder (170, FIG. 3), determine if the message is intended for this particular RPU and if so then to strobe the data through register 347 to lines 178 (FIG. 3), or (2) for a CPU decoder, to identify the RPU sending the information. The $Q_0$ output from decimal decoder 356 clears the counter 358 in response to the 000 address from counter 354.

A counter 366, which may be identical to counter 354, counts out a three-quarter bit cell time following an initiating gate signal presented to the load (Ld) input of the counter from the $Q_3$ output of the decimal decoder 356. The three-quarter bit time count is detected by the count decode circuit 368 which provides a discrete signal indicative of the count on a line 370 to the $D_4$ input of the MPX 349.

In the operation of the decoder 252, the bi-phase signal on the line 343 is presented with the line 350 clock signal to the edge detector 341. The first three and last one of the frame signal bits of the bi-phase signal of FIG. 6 illustration (c) is reproduced for convenience of description in FIG. 8 illustration (a), and illustration (b) shows the line 350 clock. The appearance of the START FLAG bit at time $t_0$ causes edge detector to sense the leading edge transition 380 (illustration (a)) and provide a pulse 381 (illustration (c)) at a one-sixteenth bit time ($t_{b/16}$) pulse width through line 351 to the $D_0$ and $D_2$ inputs of the MPX 352. The counter 354, with its address count on lines 353 at the 000 count at $t_0$ (illustrations (f)–(h), LSB to MSB respectively) as a result of either: a power on reset presented on a line 372 included in lines 258 from the control unit, or from the EOF discrete from the bit counter 358, addresses the $D_0$ input of MPX 352 allowing the pulse 381 to be presented to the enable (E) input of the counter 354. At the same time the address 000 state sets the $Q_0$ output (illustration (i)) of decode 356 low, clearing the bit counter 358 to a zero bit count. The pulse 381 enablement of the counter 354 causes the address to increment to the 001 state at $t_1$ (illustrations (f)–(h)) addressing the $D_1$ input of the MPX which is maintained at a logic one by the voltage source 382 (FIG. 7), together with the $D_3$ and $D_5$ inputs allowing a second increment of the address to the 010 state at $t_2$ (illustrations (f)–(h)).

The 001 address count also sets the $Q_1$ output (illustration (j)) from decimal decode 356 high, which is inverted through gate 383 and presented through the shift register gate circuitry 384 to the shift register 345, clocking in the first data bit (LSB) on the line 343 (385, illustration (n)) into the register on the next clock pulse. The first bit is clocked in at approximately the one-quarter bit time. The next 010 address count sets the $Q_1$ output low and addresses the $D_2$ input of the MPX 352 which is connected to the edge detector output on the line 351, such that in the absence of a pulse on the line 351 the counter 354 is disabled.

At the midbit transition 386 of the START BIT (illustration (a)) the detector 344 provides a pulse 387 (illustration (c)) which again enables the counter 354, incrementing the lines 353 address to the 011 count at $t_3$ (illustrations (f)–(h)) addressing the $D_3$ MPX input and setting the $Q_3$ output low (388, illustration (k)) which is presented to the load (Ld) input of the counter 366 allowing the counter to count a three-quarter bit time interval from the midbit transition 386 (illustration (a)) of the first bit. A preset count is provided to the counter 366 by a count select circuit 389, at a preset value equal to the bit time between the midbit transition and the start of the three-quarter bit count (processor time) to ensure that the discrete on the line 370 occurs at the one-quarter bit time of the second bit on the line 343. Since the $D_3$ input is high the counter 354 remains enabled and increments to a 100 count ($t_4$) address, addressing the $D_4$ input of MPX 352 which is low in the absence of a three-quarter bit time discrete. The appearance of the three-quarter bit time discrete on the line 370 at $D_4$ enables the counter 354 which increments the address to the 101 count at $t_5$ (illustrations (f)–(h), setting the inverted $Q_5$ output high (390, illustration (1)) which is presented through gate circuitry 384 to the shift register 345, clocking in the second data bit on the line 343 (first ID bit). The inverted $Q_5$ signal is also presented to the input of an AND gate 391, a second input of which is connected through an invert gate 392 to the decode 360 of the bit counter 358. The output of the AND gate 391 is inverted by the gate 393, such that in the absence of an EOF discrete, i.e. the output of decode 360 is a logic low indicating that less than a full frame (M+4 bits) have been clocked into register 345, each $Q_5$ logic one signal sets the line 363 to a logic low (393, 394 illustration (e)) which when presented to the load (Ld) input of counter 354 resets the counter from the 101 count back to a preset 010 count ($t_6$, $t_7$ illustrations (f)–(h)). The 010 count addresses the $D_2$ input of MPX 352 causing the counter to be disabled until the presence of a pulse from the edge detector 344 indicating a midbit transition of the data on the line 343, i.e. the presence of the next bit within a present frame. When the counter 358 reaches a bit count of M+4 (full frame), the EOF discrete is generated by decode 360, the line 363 remains high even at the appearance of a $\bar{Q}_5$ high. The counter 354 increments from the 101 state to the 110 state ($t_8$ illustrations (f)–(h)) setting the $Q_6$ output low (395 illustration (m)) providing a logic low on a line 396 presented to the CLEAR input of the counter (397 illustration (d)) clearing the counter to the 000 address state ($t_9$ illustrations (f)–(h)) and preparing the decoder to receive the next frame of bi-phase signal information.

Each successive bit of the frame serial data on the line 343 is clocked into the register 345 in an identical manner, i.e. the midbit transition of a preceding bit cell is detected initiating the three-quarter bit time countdown following which the $Q_5$ logic one discrete clocks the register 345 which shifts in the next data bit present on the line 340. The result is a shift in the signal data at the quarter bit time of each successive bit cell. As may be apparent, in the first half of each bit cell the logic level of the bi-phase encoded signal corresponds exactly to the NRZ signal transmitted.

In the operation of the line protocol, three working levels of intraunit communication are established: a health check level, an inter-active control level, and a reprogramming level. The reprogramming level provides for changes in the operand program of one or more RPUs in response to an operator entry via the keyboard (266, FIG. 4) requesting changes in control function. The health check level is provided through the CPU sequential interrogation by the CPU of each RPU in the system, requesting a status. This status request is made periodically, typically once every second by the CPU. The RPUs respond with a sixteen bit status code established for the system and presented in the third and fourth bytes (second frame information field) of the message unit. The inter-active control level is the actual exchange of control information in the system, wherein the CPU requests a readout of each RPU's RAM data, i.e. that data measured in the apparatus controlled by the particular RPU, which is transmitted to the CPU by each RPU periodically, on request. The CPU uses this information to calculate new control set points for the RPUs, such as reference temperatures, which are then transmitted back.

In this type of supervisory control, the CPU as the central controller must constantly communicate with each RPU in the system in the health check and inter-active control levels. Each RPU must interrupt its control operation to respond to the CPU. Since a number of RPUs are multi-dropped on a common one of the trunklines ($60_a$, $_b$–$63_a$, $_b$) each receive the transmissions appearing on the line, from CPU to RPU and the responding RPU to CPU transmissions. Each RPU interrupts its operation only in response to a message unit addressed to it from the CPU, however, since the address appears within the first byte of the first frame which is the first byte of the message unit, the similar positioned bytes of the message unit, such as the 3rd, 5th, 7th and so on, may contain digital information in a form identical to a given RPU address, causing the RPU to interrupt. To prevent this, the ID flag identifies the first frame of each message unit transmitted from the CPU with a unique bit pattern which does not appear in any other frame of any message unit, including the first frame of a message unit transmitted from the RPU. Each CPU first frame is uniquely identified, thereby ensuring RPU interrupt only in response to a CPU first frame which includes the address of the particular RPU. In the present embodiment the ID flag for each CPU first frame is set at a 1,0 (the frame second bit set at zero, the third bit at one), and the ID flag for all remaining frames is set at 1,1.

Each CPU first frame includes the address of the RPU to which the message unit is directed. Each RPU first frame includes the address of the RPU sending the message. The RPUs are programmed to alternate, periodically at an established switch over time interval, between the (a) and (b) triaxial lines of the trunkline (60–63) on which the RPU is connected. Each message unit transmitted by the CPU must be positively acknowledged (ACK) within a set time interval upon error-free reception by the RPU. A failure to transmit the ACK within the period, which is monitored by the CPU with a watchdog timer, causes the CPU to retransmit the message. This retransmittal is made on the same line (a) or (b) as that used for the original, and may be provided a number of times for a given message unit after which, if there is a continuing absence of the ACK from the RPU, the CPU transmits the same message unit over the alternate line. The continued absence of the ACK indicates failure in the RPU or the trunkline pair. This may be easily isolated to the RPU itself if the CPU continues to receive communications from the remaining RPUs further down the same line.

The RPU switch-over intervals are staggered, the intervals may be equal but the switch-over occurs at different times such that the CPU simultaneously communicates with RPUs on the same trunkline through different ones of the (a), (b), pair. This allows for constant monitoring of the integrity of each of the triaxial lines in the pair.

The line protocol of the present invention establishes a low overhead method of exchanging, asynchronously, digital information in a supervisory type control system. Message unit lengths are limited in frame number to ensure the lowest probability of error in the CRC function, typically 128 frames, or 256 eight bit bytes (2048 bits) of information in each message unit, which includes a sixteen bit polynominal CRC cable of checking $Z^{16}$ (65,536) bits. Interrupt of RPUs multi-dropped on a common trunkline is limited only to message units addressed to the particular RPU and the integrity of the intercommunication is assured by a distinguishing ID flag pattern unique to CPU first frames. Similarly, although the invention has been shown and described with respect to a preferred embodiment thereof, it should be understood by those skilled in the art that the foregoing and various other changes, omissions and additions in the form and detail thereof may be made therein without departing from the spirit and the scope of the invention.

Having thus described typical embodiments of my invention, that which I claim as new and desire to secure by Letters Patent is:

1. A method of exchanging digital signal information asynchronously between a central processing unit (CPU) and one or remote processing units (RPU), each alternating as a sending unit and a receiving unit, comprising the steps:

formatting the digital signal information at the sending unit into one or more message units, each having one or more successive serial bit cell data frames and a cyclic redundancy checking (CRC) frame, all of equal bit length, each frame including, from the least significant bit (LSB) to the most significant bit (MSB), a header field, an information field, and a trailer field, the header including a single bit (LSB) start flag and a two bit identification flag, the information field including multi-bit first and second bytes for receiving the signal information and CRC information in related frames, and the trailer field including a single bit (MSB) stop flag;

encoding each message unit into a serial bi-phase signal with a signal level transistion in each bit cell of each frame, the direction of signal level transition being dependent on the binary state of the signal bit in the cell, thereby providing a manifestation of the digital signal information and time base provided by the sending unit;

transmitting the bi-phase signal to the receiving unit through a transformer coupled communication line; and decoding the bi-phase signal at the receiving unit to restore the binary state of each signal bit and the time base of the sending unit.

2. The method of claim 1, further including following the step of decoding, the steps of:

verifying with the CRC frame the accuracy of each message unit decoded by the receiving unit;

acknowledging the accuracy of each message unit decoded by the receiving unit by transmitting a serial acknowledge bi-phase encoded signal to the sending unit within a selected time interval; and monitoring, at the sending unit, the presence of said acknowledge bi-phase signal within said selected time interval, and in response to the absence thereof retransmitting the message unit.

3. The method of claim 2, wherein the step of formatting includes the steps of:

addressing the RPU associated with a message unit, whether as sending unit or receiving unit, with an address signal in the first byte of the first frame information field; and identifying the first frame of each message unit transmitted by the CPU with an ID flag bit pattern different from the ID flag pattern of each successive frame in the message unit and different from the ID flag of each frame, including the first frame, of message units transmitted from each RPU, each RPU interrupting operation only in response to a message unit received with a first frame CPU ID flag pattern and first byte address identifying the RPU.

* * * * *

UNITED STATES PATENT AND TRADEMARK OFFICE
CERTIFICATE OF CORRECTION

PATENT NO. : 4,241,398
DATED : December 23, 1980
INVENTOR(S) : Richard T. Carll

It is certified that error appears in the above-identified patent and that said Letters Patent are hereby corrected as shown below:

Column 1, introductory paragraph should read --

CROSS REFERENCE TO RELATED APPLICATIONS

Portions of the subject matter hereof is also disclosed in a commonly owned, copending application entitled COMPUTER CONTROLLED FACILITY MANAGEMENT SYSTEM (FMS), U.S. Serial No. 864,557, filed on December 27, 1977 by John E. Games et al., now Patent No. 4,212,078 issued July 8, 1980--.

Column 3, line 34, "illustrating" should be --illustration--.

Column 9, line 45 after "(bit cells 2, 3)" insert --,--.

Column 14, line 6 after "or" insert --more--.

Signed and Sealed this

Tenth Day of March 1981

[SEAL]

Attest:

RENE D. TEGTMEYER

Attesting Officer     Acting Commissioner of Patents and Trademarks